United States Patent Office 2,695,864
Patented Nov. 30, 1954

2,695,864

PREPARATION OF COBALAMINES USING A SPECIAL ACTINOMYCETE AND MUTANTS THEREOF

Joseph F. Pagano, Bridgewater Township, Middlesex County, and George Greenspan, New Brunswick, N. J., assignors to Olin Mathieson Chemical Corporation, a corporation of Virginia No Drawing. Application November 7, 1951,
Serial No. 255,332

8 Claims. (Cl. 195—80)

This invention relates to a method for the preparation of cobalamines by use of a special actinomycete and a mutant thereof.

When used herein, the term "cobalamine" is generic and includes vitamin B12, cyano form, vitamin B12a and other vitamin B12-like compounds; while the term "cyanocobalamine" is limited to vitamin B12, cyano form, and the term "hydroxocobalamine" is limited to vitamin B12a.

The special actinomycete is one isolated from soil samples in the New York area and found to produce surprisingly high yields of cobalamines, an almost threefold increase having been observed over the yield obtained with a strain of Streptomyces griseus used in the commercial production of cobalamines. Moreover, when the parent culture is grown on agar plates in the presence of streptomycin, mutations are effected, with one of the mutants producing an even greater quantity of cobalamines than the parent culture.

The objects of this invention are attained by growing such organism in a suitable aqueous nutrient medium, and recovering the medically-useful products, especially cobalamines, from the culture liquid—preferably after having subjected the fermented broth to cell-rupture treatment (i. e., by acidification or treatment with sonic waves) to release the cobalamines from the solids in the medium. Numerous methods for the recovery of the cobalamines are known, such as those described in U. S. Patent 2,530,416.

If it is desirable to enhance the yield of cyanocobalamine, this may be done by the procedure described in U. S. Patent 2,530,416, by intermittent cyanide treatment during fermentation (as is shown in application Serial No. 245,648, filed September 7, 1951) or the intermittent nitrile treatment during fermentation (as is shown in application Serial No. 252,806, filed October 23, 1951.

The nutrient media useful in the process of the invention must include sources of assimilable carbon, nitrogen, and cobalt. As sources of assimilable carbon, there may be used; (1) carbohydrates, such as glucose, fructose, sucrose, maltose, dextrins and soluble starches; (2) substances containing carbohydrates, such as corn steeping liquor and grain mashes; (3) polyhydric alcohols, such as glycerol; (4) fats, such as lard oil, soybean oil, linseed oil, cottonseed oil, peanut oil, coconut oil, corn oil, castor oil, sesame oil, crude palm oil, fancy mutton tallow, sperm oil, olive oil, tristearin, triolein and tripalmitin; and (5) fat acids having more than 14 carbon atoms such as stearic acid, palmitic acid, oleic acid, linoleic acid and myristic acid. Either individual substances or mixtures of these carbon-source materials may be used, the quantities being determined from the point of view of optimum yield of medicinally-useful substances. When fats or fat acids are used, those that are liquid or readily liquefiable are preferred from the standpoint of convenience. Thus, certain solid fats and fat acids may be liquefied by warming, and then incorporated in the aqueous medium; or (preferably) they may be added to the medium and dispersed therein in the sterilization step (by beating). Although relatively pure medium components are preferred, various technical grades and mixtures may be used.

Sources of available nitrogen include: (1) organic nitrogen compounds, such as proteinaceous materials, e. g., soybean meal, fish meal, casein, whey or whey concentrates, amino acids and liver cake; and (2) inorganic compounds, such as nitrates or ammonium compounds.

Assimilable cobalt may be supplied to the nutrient medium in a variety of forms. It may be provided in the form of cobalt salts, such as cobalt chloride or cobalt nitrate; or it may be provided in the form of organically-bound cobalt, such as a cobalt-containing yeast, preferably one containing a relatively high proportion of cobalt (i. e., about 100 or more parts per million).

The nutrient media may, of course, contain any of the additional components usually found in such solutions, as antifoam agents (e. g., lard oil, octadecanol, etc.), metallic cations, such as potassium, calcium, magnesium and iron (which may be present in the crude materials used in the nutrient medium), and phosphates (which may be added as inorganic phosphate).

The fermentation process of the invention may be carried out at temperatures from about 20° C. to about 40° C., with a temperature of about 30° to 37° C. being preferred.

A culture of the special actinomycete of this invention, isolated from soil found under a grapevine in Brooklyn, New York, has been filed with the American Type Culture Collection, Washington, D. C., and is available therefrom under No. ATCC 11071. The actinomycete will be identified hereinafter in the specification and claims as Actinomycete ATCC No. 11071. The organism has the following characteristics: It is a Streptomyces sp., characterized by monopodially branched, colorless, nonseptate mycelium. On soybean infusion agar, colonies are small, round with smooth edges, the central portion of which is gray with a surrounding white ring. The reverse, central portion of the colony is light tan. On yeast beef agar, the colonies have irregular edges with depressed centers, the surface of which is light gray to tan. The reverse of the colony is light to dark brown. Growth is slow on Sabouraud's agar and Czapek-Dox agar, giving rise to small light gray to white colonies.

The mycelium obtained from yeast beef agar and soybean infusion agar is gram variable; mostly gram positive. Spores are oblong shape, gram positive and measure from 2.1 to 2.5μ in length by 1.1 to 1.2μ in width.

This organism readily utilizes numerous carbon sources including glucose, galactose, fructose, mannose, maltose, sucrose, dextrin, inulin, raffinose, rhamnose, starch, glycerol, citrate, and succinate. Among other carbon-furnishing substances, arabinose, xylose, sorbitol, salacin, acetate and lactose support growth which is slight.

The following carbon compounds do not support the growth: dulcitol, inositol, mannitol, formate and tartrate.

Several nitrogen containing compounds are readily utilized as sources of nitrogen including ammonium sulfate, sodium nitrate, asparagine, 1-tyrosine, acetamide and dl-tryptophane. Sodium nitrate supports slight growth.

The organism does not produce indole from tryptophane. It reduces nitrate to nitrite.

The preferred mutant of this actinomycete may be prepared by growing the parent strain on agar plates in the presence of a bacteriophage preparation which is capable of lysing Streptomyces griseus, by the following procedure:

Spores of Actinomycete sp. ATCC 11071, obtained from a 7-day ferment, are exposed to a streptomycin concentration of 1.5 to 3.0 units/ml. in plates containing yeast beef agar. After seven days' incubation, the surviving colonies are transferred to soybean meal agar slants and retained for subsequent use. A culture of the mutant, prepared as described above, has been filed with the American Type Culture Collection, Washington, D. C., and is available therefrom under No. ATCC 11072.

It appearance and properties (except as to the rate of production of vitamin B12) are not substantially different from those of the parent culture. The mutant will be identified hereinafter, in the specification and claims as Mutant ATCC No. 11072.

In order to illustrate the invention, there follow numerous specific embodiments of the invention:

EXAMPLES I TO VII

An aqueous medium containing, per liter: soybean meal, 30 g.; $K_2HPO_4 \cdot 3H_2O$, 1 g.; glucose, 20 g., and $Co(NO_3)_2 \cdot 6H_2O$, 0.025 g., is distributed in 25 ml. portions in 250 ml. Erlenmeyer flasks, and the flasks are plugged with nonabsorbent cotton and sterilized in the usual manner (i. e., by autoclaving). When cool, each of the flasks is inoculated with about 3% of an Actinomycete ATCC No. 11071 inoculum (the 24-hour vegetative growth of the organism in a soybean meal-glucose medium) and the flasks are mechanically shaken on a rotary shaker making 285 R. P. M. at $25° \pm 1°$ C. and tested for cobalamine potency after fermentation for 2 and 3 days. The results obtained in this example and in others using the same experimental procedure with other nutrient media and incubation temperatures are tabulated below in Table 1.

Table 1

| Example No. | Medium, g./l. | Cobalamine potency (µg./ml.) | | | |
|---|---|---|---|---|---|
| | | After incubation at $25° \pm 1°$ C. | | After incubation at $37° \pm 1°$ C. | |
| | | 2 days | 3 days | 2 days | 3 days |
| I and II | Soybean meal, 30 g.; $K_2HPO_4 \cdot 3H_2O$, 1 g.; Glucose, 20 g.; $Co(NO_3)_2 \cdot 6H_2O$, 0.025 g. | 1.25 | 2.1 | 1.75 | 3.65 |
| III and IV | Soybean meal, 30 g.; $K_2HPO_4 \cdot 3H_2O$, 1 g.; Starch, 40 g.; $Co(NO_3)_2 \cdot 6H_2O$, 0.025 g. | 1.2 | 1.9 | 2.1 | 3.3 |
| V and VI | Soybean meal, 30 g.; $K_2HPO_4 \cdot 3H_2O$, 1 g.; Soybean oil, 8.8 g.; $Co(NO_3)_2 \cdot 6H_2O$, 0.25 g. | 1.4 | 2.3 | 1.4 | 3.4 |
| VII | Distillers solubles, 40 g.; Glucose, 40 g.; $CaCO_3$, 5 g.; $Co(NO_3)_2 \cdot 6H_2O$, 0.025 g. | 1.3 | 2.1 | | |

Examples I, III, V and VII above are those carried out at $25° \pm 1°$ C. less while Examples II, IV and VI are those carried out at $37° \pm 1°$ C.

EXAMPLES VIII AND IX

The procedure of Example I is followed using a glass-lined fermentor containing 3028 liters of a basal medium of the following composition: soybean meal, 30 g.; glucose, 20 g.; $CoCl_2 \cdot 6H_2O$, 0.025 g.; $K_2HPO_4 \cdot 3H_2O$, 0.6 g.; $H_2O$ to make 1 liter. The results obtained carrying out the process at $25° \pm 1°$ C. (Example VIII) and at $30° \pm 1°$ C. (Example IX) are given in Table 2.

Table 2
[Cobalamine potency (µg./ml.).]

| After incubation at $25° \pm 1°$ C. | | | After incubation at $30° \pm 1°$ C. | | |
|---|---|---|---|---|---|
| 40 hrs. | 60 hrs. | 90 hrs. | 40 hrs. | 60 hrs. | 90 hrs. |
| 0.80 | 1.27 | 1.74 | 1.08 | 1.49 | 1.83 |

EXAMPLES X TO XIV

Following the procedure of Example I but using Mutant ATCC No. 11072 instead of Actinomycete ATCC No. 11071, medically-useful products are obtained Table 3, below, shows the cobalamine produced by this procedure.

Table 3

| Example No. | Medium, g./l. | Vitamin B12 potency (µg./ml.) | | | |
|---|---|---|---|---|---|
| | | After incubation at $25° \pm 1°$ C. | | After incubation at $37° \pm 1°$ C. | |
| | | 2 days | 3 days | 2 days | 3 days |
| X and XI | Soybean meal, 30 g.; glucose, 20 g.; $K_2HPO_4 \cdot 3H_2O$, 1 g.; $Co(NO_3)_2 \cdot 6H_2O$, 0.025 g. | 2.2 | 3.5 | 2.3 | 1.9 |
| XII | Soybean meal, 30 g.; starch, 30 g.; $K_2HPO_4 \cdot 3H_2O$, 1 g.; $Co(NO_3)_2 \cdot 6H_2O$, 0.025 g. | 2.4 | 3.6 | | |
| XIII | Soybean meal, 30 g.; soybean oil, 8.8 g.; $K_2HPO_4 \cdot 3H_2O$, 1 g.; $Co(NO_3)_2 \cdot 6H_2O$, 0.025 g. | 1.6 | 3.2 | | |
| XIV | Distillers solubles, 4 g.; glucose, 20 g.; $CaCO_3$, 5 g.; $Co(NO_3)_2 \cdot 6H_2O$, 0.025 g. | 1.7 | 3.7 | | |

Example XI is run at $37° \pm 1°$ C., the remaining examples are at $25° \pm 1°$ C.

EXAMPLES XV AND XVI

The procedure of Example I is followed using Mutant ATCC 11072 and a glass-lined fermentor containing 3028 liters of a basal medium of the following composition: soybean meal, 30 g.; glucose, 20 g.; $CoCl_2 \cdot 6H_2O$, 0.025 g.; $K_2HPO_4 \cdot 3H_2O$, 0.6 g.; $H_2O$ to make 1 liter. The results obtained carrying out the process at $25° \pm 1°$ C. (Example XV) and at $33° \pm 1°$ C. (Example XVI) are given in Table 4.

Table 4
[Cobalamine potency (µg./ml.).]

| After incubation at $25° \pm 1°$ C. | | | After incubation at $33° \pm 1°$ C. | | |
|---|---|---|---|---|---|
| 40 hrs. | 70 hrs. | 90 hrs. | 40 hrs. | 70 hrs. | 90 hrs. |
| 0.99 | 2.25 | 2.77 | 1.17 | 3.40 | 4.62 |

EXAMPLE XVII (a) To a 500 ml. Erlenmeyer flask containing, as a nutrient medium, soybean meal, 1.5 g.; dextrose, 2.16 g.; sodium chloride, 0.05 g.; distilled water, 100 ml., there is added, as inoculum, lyophized spores of Actinomycete ATCC No. 11071. The contents of the flask are incubated for 48 hours at $25° \pm 1°$ C. on a reciprocating shaker.

(b) The contents of the flask, obtained as described in (a) are used to inoculate an aqueous nutrient medium containing soybean meal, 270 g.; dextrose, 194.4 g.; sodium chloride, 12 g.; sodium hydroxide, 0.3 g.; silicone (Dow-Corning), 1% in mineral oil, 20 ml.; water to make 12 liters, in a 19-liter carboy. Sterile air is passed into the carboy through a linen sack sparger at the rate of one liter per liter of solution per minute. Incubation is carried on for 48 hours at $25° \pm 1°$ C.

(c) The contents of the carboy, obtained as described in (b) are transferred to a 568 liter germination tank containing, as nutrient solution, soybean meal, 8.50 kg.; dextrose, 5.94 kg.; $CoCl_2 \cdot 6H_2O$, 19.2 g.; lard oil, 280 ml.; water to make 378.5 liters. Sterile air is passed into the germination vessel through a difffuser valve at the rate of 73.0 liters per liter of solution, per hour. The contents of the vessel are agitated by means of a 120 R. P. M. stirrer while tank temperature is maintained at $25° \pm 1°$ C. and the fermentation is allowed to proceed for 24 to 30 hours.

(d) A 75.6 kg. portion of the fermented material obtained as described in (c) is transferred to a fermentation vessel containing, as nutrient medium, soybean meal, 90.7 kg.; dextrose, 66.7 kg.; $CoCl_2 \cdot 6H_2O$, 76 g.; $K_2HPO_4 \cdot 3H_2O$, 1.8 kg.; water to make 3028 liters. The pH of the medium is adjusted to 7.0±0.1 with sterile sodium hydroxide before inoculation. Sterile air is passed into the fermentation vessel through a diffuser valve at the rate of 39.2 liters per liter of solution, per hour. Throughout the fermentation process, the contents of the vessel are mechanically agitated by means of a whip type agitator at a rate of 120 revolutions per minute while tank pressure is maintained at 0.7 kg./cm.$^2$ and temperature is controlled within the range of 28° C to 34° C. After the fermentation has proceeded for 96 hours, the contents of the fermentation vessel are tested for cobalamine potency, a titer of about 5.7μg./ml. being obtained.

As has been noted above, it is preferred to subject the fermentation broth to a cell-rupture treatment to liberate the cobalamines bound in the microbial cells.

The effects of such treatment on the broths obtained in the fermentation of Actinomycete ATCC No. 11071 are tabulated below (Table 5).

Table 5

| Fermentation Period | Treatment | Cobalamines in cell-free solution, μg./ml. |
|---|---|---|
| 4 days | None | 0.08 |
| | Acidification to pH of 2.5 | 0.88 |
| | Exposure to Sonic waves (10 kc.) | 1.11 |
| 6 days | None | 0.45 |
| | Acidification to pH of 2.5 | 1.56 |
| | Exposure to Sonic waves (10 kc.) | 1.77 |

Analogous results are obtained in cell-rupture of broths obtained from the fermentation of Mutant ATCC No. 11072.

Following the cell-rupture treatment the medically-useful products may be recovered, as, for example, the recovery of cobalamines in the form of cyanocobalamines by the process shown in U. S. Patent 2,530,416.

This invention may be variously otherwise embodied within the scope of the appended claims.

We claim:

1. A method which comprises growing a microorganism of the class consisting of Actinomycete ATCC No. 11071 and Mutant ATCC No. 11072, in a suitable sterile aqueous, nutrient medium containing assimilable sources of carbon, nitrogen and cobalt, whereby fermentation results and vitamin B-12 is produced, and recovering the vitamin B-12 from the fermented broth.

2. The method of claim 1 wherein the microorganism used is Actinomycete ATCC No. 11071.

3. The method of claim 1 wherein the microorganism used is Mutant ATCC No. 11072.

4. The method of claim 2 wherein the fermentation temperature range is about 30° to about 37° C.

5. The method of claim 3 wherein the fermentation temperature range is about 30° to about 37° C.

6. The method of claim 1 wherein the fermentation broth is subjected to cell-rupture treatment prior to recovery of the vitamin B-12.

7. The method of claim 1 wherein cyanide ion or nitrile is supplied to the fermentation medium in such amounts as to enhance the yield of vitamin B-12.

8. The method of claim 1 wherein the carbon source consists, at least in part, of a member of the group consisting of (1) fats and (2) fat acids having more than 14 carbon atoms.

References Cited in the file of this patent

UNITED STATES PATENTS

| Number | Name | Date |
|---|---|---|
| 2,230,130 | Bucherer | Jan. 28, 1941 |
| 2,363,227 | Burkholder | Nov. 21, 1944 |
| 2,461,922 | Rake | Feb. 15, 1949 |
| 2,516,080 | Sobin | July 18, 1950 |
| 2,530,416 | Wolf | Nov. 21, 1950 |
| 2,550,450 | Brown | Apr. 24, 1951 |
| 2,563,794 | Rickes | Aug. 7, 1951 |
| 2,595,499 | Wood et al. | May 6, 1952 |
| 2,643,213 | Hall | June 23, 1953 |
| 2,650,896 | McDaniel | Sept. 1, 1953 |

OTHER REFERENCES

Stumpf et al., Jour. Bact., 51, 1946, pages 487–493.
Porter, Bacterial Chemistry and Physiology, 1946, John Wiley & Sons, Inc., N. Y., pages 255, 837, 838.
Rickes, Science, vol. 108, December 3, 1948, pages 634, 635.
Hendlin, Science, vol. III, May 19, 1950, pages 541, 542.
Brink, Science 112, Sept. 29, 1950, pages 354–355.
Saunders et al., Jour. Bact., 64, 5, Nov. 1952, pages 725–28.